(12) United States Patent
Yang et al.

(10) Patent No.: US 9,291,842 B2
(45) Date of Patent: Mar. 22, 2016

(54) DISPLAY DEVICE, ELECTRONIC APPARATUS, AND METHOD FOR MANUFACTURING DISPLAY DEVICE

(71) Applicant: Japan Display Inc., Tokyo (JP)

(72) Inventors: Yingbao Yang, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 170 days.

(21) Appl. No.: 14/185,584

(22) Filed: Feb. 20, 2014

(65) Prior Publication Data

US 2014/0285992 A1    Sep. 25, 2014

(30) Foreign Application Priority Data

Mar. 19, 2013 (JP) ................. 2013-057299

(51) Int. Cl.
*H05K 7/14*   (2006.01)
*H05K 13/00*  (2006.01)
*G06F 1/16*   (2006.01)
*G02F 1/1333* (2006.01)
*G06F 3/14*   (2006.01)

(52) U.S. Cl.
CPC ........ *G02F 1/133305* (2013.01); *G06F 1/1641* (2013.01); *G06F 3/1431* (2013.01); *G09G 2380/02* (2013.01); *Y10T 29/49002* (2015.01)

(58) Field of Classification Search
CPC ................. H01L 51/0097; H01L 2251/5338; H01L 27/124; H01L 27/3225; H01L 27/323; H01L 27/3251; H01L 27/3267; H01L 51/524; G06F 3/0412; G06F 2203/04103; G06F 1/16; G06F 1/1652; G06F 3/1423; G09G 2300/04; G09G 3/30; G02F 2001/133342; G02F 2001/133519; G02F 2001/13396; G06K 19/025

USPC ................................ 257/72; 361/679.27, 792
See application file for complete search history.

(56) References Cited

U.S. PATENT DOCUMENTS

| | | | | |
|---|---|---|---|---|
| 8,258,694 | B2* | 9/2012 | Oh | B29D 11/0073 257/40 |
| 2002/0190961 | A1* | 12/2002 | Chen | G06F 3/044 345/173 |
| 2008/0079656 | A1* | 4/2008 | Kee | G06F 1/1641 345/1.3 |
| 2008/0236905 | A1* | 10/2008 | Endo | G02F 1/13338 178/18.03 |
| 2011/0210937 | A1* | 9/2011 | Kee | G06F 3/041 345/174 |
| 2012/0147599 | A1* | 6/2012 | Shim | G06F 1/1652 362/231 |
| 2012/0243207 | A1* | 9/2012 | Wang | G09F 9/301 362/97.1 |
| 2014/0029212 | A1* | 1/2014 | Hwang | G09F 9/33 361/749 |

FOREIGN PATENT DOCUMENTS

JP    2011-065173    3/2011

\* cited by examiner

*Primary Examiner* — Robert J Hoffberg
*Assistant Examiner* — Michael Matey
(74) *Attorney, Agent, or Firm* — K&L Gates LLP (57) ABSTRACT

According to an aspect, a display device includes a first display panel including a first protective layer; a second display panel including a second protective layer; and a connection part that connects the first display panel and the second display panel. The connection part includes a portion of a flexible substrate included in the first display panel and the second display panel, and the first protective layer and the second protective layer have higher strength than the flexible substrate.

7 Claims, 9 Drawing Sheets

FIG.17 ated applications on Mar. 19, 2013, the entire content of which is hereby incorporated by reference.

DISPLAY DEVICE, ELECTRONIC APPARATUS, AND METHOD FOR MANUFACTURING DISPLAY DEVICE

CROSS REFERENCES TO RELATED APPLICATIONS

The present application claims priority to Japanese Priority Patent Application JP 2013-057299 filed in the Japan Patent Office on Mar. 19, 2013, the entire content of which is hereby incorporated by reference.

BACKGROUND

1. Technical Field

The present disclosure relates to a display device, an electronic apparatus provided with the display device, and a method for manufacturing the display device.

2. Description of the Related Art

There has been known a flexible display device that can be folded like a paper (see Japanese Patent Application Laid-open Publication No. 2011-065173, for example). Such a flexible display device is useful for achieving an electronic apparatus excellent in portability and capable of displaying large pictures.

However, there is a problem that the flexible display is inferior in durability.

For the foregoing reasons, there is a need for a display device and an electronic apparatus that can be folded and, at the same time, have high durability, and a method for manufacturing the display device.

SUMMARY

According to an aspect, a display device includes a first display panel including a first protective layer; a second display panel including a second protective layer; and a connection part that connects the first display panel and the second display panel. The connection part includes a portion of a flexible substrate included in the first display panel and the second display panel, and the first protective layer and the second protective layer have higher strength than the flexible substrate.

According to another aspect, an electronic apparatus includes a first display panel including a first protective layer; a second display panel including a second protective layer; and a connection part that connects the first display panel and the second display panel. The connection part includes a portion of a flexible substrate included in the first display panel and the second display panel, and the first protective layer and the second protective layer have higher strength than the flexible substrate.

According to another aspect, a method for manufacturing a display device including a first display part and a second display part, the method includes forming the first display part and the second display part protected by respective protective layers that are arranged on a flexible substrate with a space having a predetermined width interposed therebetween and have higher strength than the flexible substrate; and removing a portion of the protective layers corresponding to the space.

Additional features and advantages are described herein, and will be apparent from the following Detailed Description and the figures.

DETAILED DESCRIPTION

Hereinafter, the present disclosure is specifically explained with reference to the drawings. The explanation is made in the following order.

1. Constitution of display device
2. Method for manufacturing display device
3. Modifications
4. Application examples (electronic apparatus)
5. Aspects of the present disclosure

1. Constitution of Display Device

Figure 1:
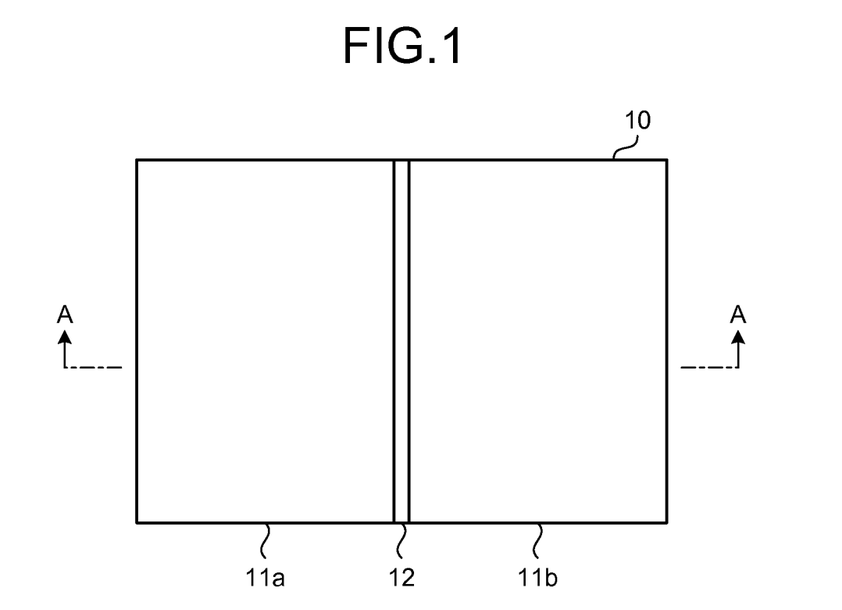
FIG. 1 is a view illustrating a state of a display device being opened.
Figure 2:
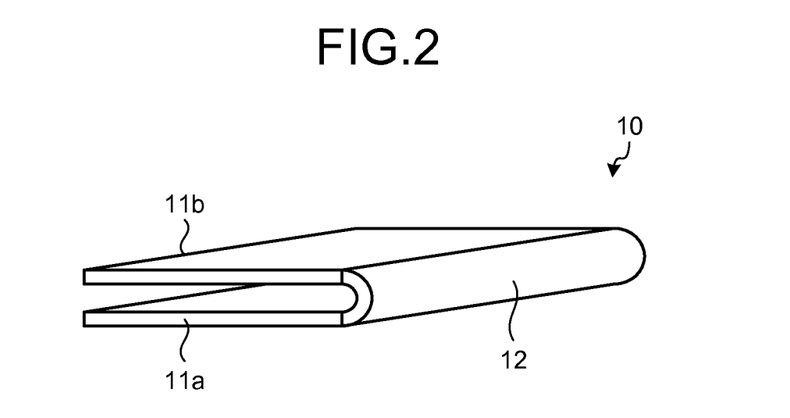
FIG. 2 is a view illustrating a state of the display being folded.
Figure 3:
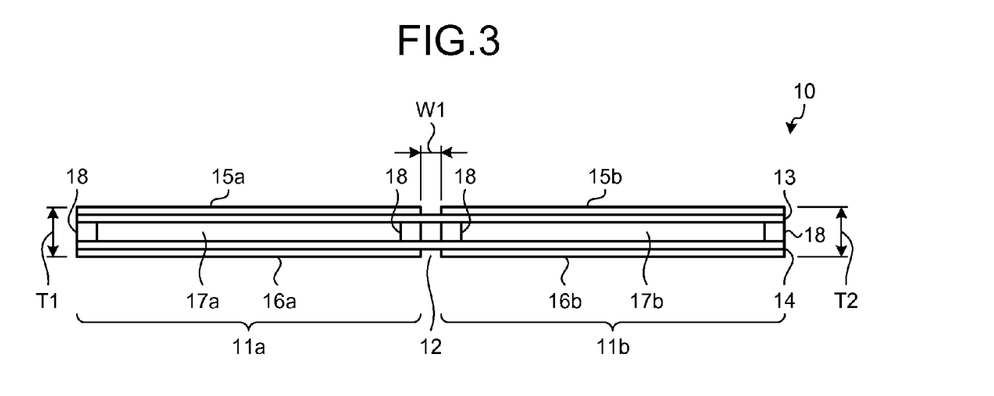
FIG. 3 is a sectional view of the display device taken along a line A-A in FIG. 1.

FIG. 1 is a view illustrating a state of a display device being opened. FIG. 2 is a view illustrating a state of the display being folded. FIG. 3 is a sectional view of the display device taken along a line A-A in FIG. 1.

As illustrated in FIG. 1 to FIG. 3, a display device 10 includes a display panel 11a (a first display panel), a display panel 11b (a second display panel), and a connection part 12 that connects the display panel 11a and the display panel 11b.

The display panel 11a includes a protective layer 15a (a first protective layer), a substrate 16a, a display part 17a (a first display part), and a sealing member 18. The display panel 11b includes a protective layer 15b (a second protective layer), a substrate 16b, a display part 17b (a second display part), and the sealing member 18. The display panel 11a, the display panel 11b, and the connection part 12 have flexible substrates 13 and 14 in common.

The display parts 17a and 17b display information including characters, figures, images, movies, and the like. Examples of the display part 17a include, but are not limited to a transmissive liquid crystal display device, a reflective liquid crystal display device, an organic electro-luminescence (EL) display device, a plasma display device, and an electronic paper.

The display surfaces of the display parts 17a and 17b are covered with the flexible substrate 13, and the other surfaces opposite to the display surfaces of the display parts 17a and 17b are covered with the flexible substrate 14. The side surfaces of the display parts 17a and 17b are surrounded by the sealing member 18. Accordingly, each of the display parts 17a and 17b is sealed with the flexible substrates 13 and 14 and the sealing member 18 to be protected from moisture, dust, and the like in the atmosphere.

The protective layer 15a covers a surface on the display surface side of the display panel 11a. The protective layer 15a is transparent and formed of a material with higher strength (rigidity) than at least the flexible substrate 13. Examples of the material of which the protective layer 15a is formed include, but are not limited to glass, resin, or the like.

The substrate 16a covers a surface opposite to the display surface side of the display panel 11a. The substrate 16a is formed of a material with higher strength than as least the flexible substrate 14. When the display part 17a requires a backlight for displaying information like the transmissive liquid crystal display device, the substrate 16a is formed of a transparent material. Examples of the material of which the substrate 16a is formed include, but are not limited to glass, metal such as stainless steel, resin, or the like.

In this manner, the display panel 11a is protected with the protective layer 15a and the substrate 16a that have high strength. Accordingly, the display panel 11a can ensure sufficient strength against external force.

The protective layer 15b covers a surface on the display surface side of the display panel 11b. The protective layer 15b is transparent and formed of a material with higher strength at least than the flexible substrate 13. Examples of the material of which the protective layer 15b is formed include, but are not limited to glass resin, or the like.

The substrate 16b covers a surface opposite to the display surface side of the display panel 11b. The substrate 16b is formed of a material with higher strength at least than the flexible substrate 14. When the display part 17b requires a backlight for displaying information like a transmissive liquid crystal display device, the substrate 16b is formed of a transparent material. Examples of the material of which the substrate 16b is formed include, but are not limited to glass, metal such as stainless steel, resin, or the like.

In this manner, the display panel 11b is protected with the protective layer 15b and the substrate 16b that have high strength. Accordingly, the display panel 11b can ensure sufficient strength against external force.

The sealing member 18 may be formed of any material, if the material can seal the display parts 17a and 17b. Examples of the material of which the sealing member 18 is formed include, but are not limited to metal, resin, or the like.

Each of the flexible substrates 13 and 14 is formed of a transparent material having plasticity. Examples of the material of which each of the flexible substrates 13 and 14 is formed include, but are not limited to polyimide (PI). Each of the flexible substrates 13 and 14 may include an electrical circuit such as transparent electrodes in a portion brought into contact with the display part 17a or 17b. On the other hand, a portion sandwiched between the display panel 11a and the display panel 11b; that is, a portion that forms the connection part 12 includes no electrical circuit.

The connection part 12 connects the display panel 11a and the display panel 11b with the flexible substrate 13 and the flexible substrate 14. The connection part 12 is not covered with any of the protective layers 15a, 15b and the substrates 16a, 16b. Accordingly, the connection part 12 has flexibility, and the display device 10 is constituted such that the display panel 11a and the display panel 11b are rotatable relative to each other with the connection part 12 as an axis of rotation.

To be more specific, when the display device 10 is opened as illustrated in FIG. 1, the display panel 11a and the display panel 11b are aligned on the same horizontal plane. In this state, the display device 10 can display one large picture extending over the display panel 11a and the display panel 11b. Different images can also be displayed on the display panel 11a and the display panel 11b to acquire a plurality of pieces of information. On the other hand, in a state that the display device 10 is folded as illustrated in FIG. 2, the display panel 11a and the display panel 11b are overlapped with each other. In this state, the display device 10 constitutes a compact shape suitable for the carriage and the storage thereof.

A space of the connection part 12 between the flexible substrate 13 and the flexible substrate 14 may be a hollow space, and the space may also be filled with a material having plasticity.

It is preferable that a width W1 of the connection part 12 (a distance between the display panel 11a and the display panel 11b) be, for example, one or more times the thickness T1 of the display panel 11a (or a thickness T2 of the display panel 11b). To apply the least stress to the connection part 12 when the display panel 11a and the display panel 11b are overlapped with each other, it is preferable that the connection part 12 be deformed in an arcuate shape by setting the width W1 to a value that satisfies the following expression:

$$W1 = (T1+T2) \times \pi$$

where $\pi$ is approximately 3.14.

The width of the connection part 12 is set to a size obtained from the expression above and hence, the display panel 11a and the display panel 11b become rotatable relative to each other and, at the same time, in displaying a picture extending over the display panel 11a and the display panel 11b, a gap between these display panels can be made less noticeable.

As explained heretofore, in the display device 10, the display panel 11a is connected with the display panel 11b by the connection part 12 having flexibility. Accordingly, the display device 10 is constituted in a foldable manner with the connection part 12 as an axis of rotation thus achieving both of the display of a large picture and easy carriage and storage.

The display device 10 is constituted such that the display part 17a and the display part 17b are sealed and protected by the protective layers 15a, 15b and the substrates 16a, 16b. Accordingly, the display device 10 can achieve high durability against moisture and dust in the atmosphere, external force, or the like.

The display device 10 is constituted such that the display part 17a is supported by the protective layer 15a and the substrate 16a that have high strength and the display part 17b is supported by the protective layer 15b and the substrate 16b that have high strength. The display device 10 can thus keep the display parts 17a and 17b flat and appropriately display information almost without causing strain thereon.

The connection unit 12 of the display device 10 has no electrical circuit. The display device 10 can thus reduce the possibility of the occurrence of electrical failures attributed to the folding thereof thus achieving high reliability.

2. Method for Manufacturing Display Device

Figure 4:
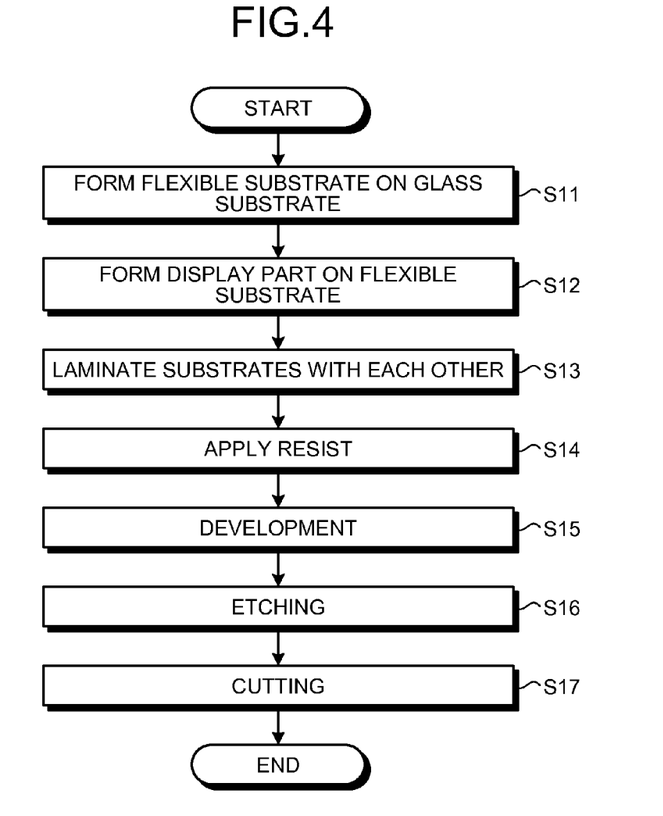
FIG. 4 is a flowchart illustrating a method for manufacturing the display device.
Figure 5:
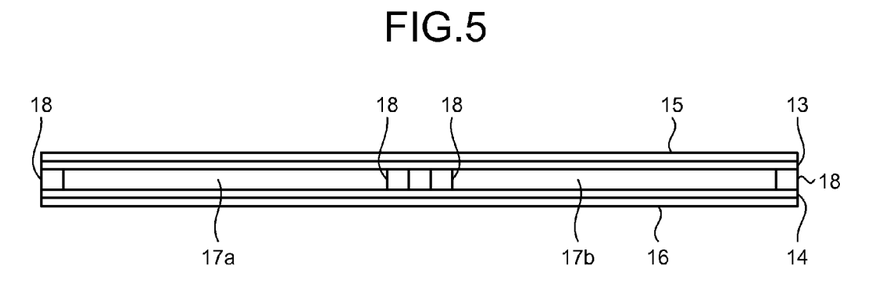
FIG. 5 is a view illustrating a state that a first display panel, a second display panel, and a connection part are integrally formed.
Figure 6:
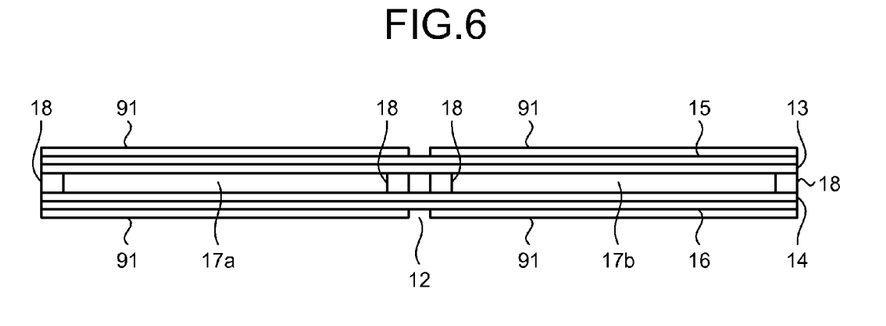
FIG. 6 is a view illustrating an example of etching process for producing the connection part.

FIG. 4 is a flowchart illustrating a method for manufacturing a display device. FIG. 5 is a view illustrating a state that a first display panel, a second display panel, and a connection part are integrally formed. FIG. 6 is a view illustrating an example of etching process for producing the connection part. The following explanation with respect to the method for manufacturing the display device is made assuming that each of the protective layers 15a, 15b and the substrates 16a, 16b is a glass substrate.

To manufacture the display device 10 illustrated in FIG. 1 to FIG. 3, first of all, a flexible substrate is formed on each of two glass substrates (Step S11). One glass substrate 15 corresponds to the protective layers 15a and 15b, and the other glass substrate 16 corresponds to the substrates 16a and 16b. The flexible substrates correspond to the flexible substrate 13 and the flexible substrate 14, respectively.

Subsequently, two display parts are formed on the flexible substrates with a space having a predetermined width interposed therebetween (Step S12). The two display parts correspond to the display part 17a and the display part 17b. The predetermined width of the space corresponds to a width of the connection part 12. A portion of the display parts may be formed on the one flexible substrate, and the remaining portion of the display parts may be formed on the other flexible substrate. The display parts may be entirely formed on the one flexible substrate. The process of forming the display parts may include, for example, a plurality of processes such as a process of forming transparent electrodes or a process of forming liquid crystal layers. At this stage, the sealing member 18 is mounted on at least the one flexible substrate.

Subsequently, the two glass substrates are laminated with each other in such a manner that the display parts are sandwiched between the two glass substrates (Step S13). At this stage, as illustrated in FIG. 5, a portion corresponding to the display panel 11a, a portion corresponding to the display panel 11b, and a portion corresponding to the connection part 12 are integrally formed.

Subsequently, an etching process for forming the connection part 12 is performed. To be more specific, resist 91 is applied to each of the glass substrates (Step S14) and thereafter, a development process removes the resist 91 corresponding to the portion in which the connection part 12 is formed (Step S15). As illustrated in FIG. 6, this constitutes a state that the resist 91 is remained on the surface of each of the glass substrates except for the portion in which the connection part 12 is formed. The etching process is performed in this state thus partially removing the glass substrates that cover the portions corresponding to the connection part 12 (Step S16).

Thereafter, a cutting process removes unnecessary portions (Step S17). In Step S11 to Step S16, a plurality of display devices may be simultaneously formed as an integral body. In this case, in Step S17, the integral body is separated into the respective display devices.

In FIG. 4, an example of forming the connection part 12 by etching is explained. However, a process for forming the connection part 12 in a state illustrated in FIG. 5 is not limited to the etching process. For example, a mechanical process such as machining or grinding may remove the glass substrate covering a portion corresponding to the connection part 12.

As explained heretofore, the display device 10 is manufactured in such a manner that a portion corresponding to the display panel 11a, a portion corresponding to the display panel 11b, and a portion corresponding to the connection unit 12 are integrally formed and thereafter, a member with high strength that covers a portion corresponding to the connection part 12 is removed. Accordingly, it is easy to adjust the width of the connection part 12 thus narrowing a distance between the display panel 11a and the display panel 11b. The distance between the display panel 11a and the display panel 11b is narrowed and hence, when one picture extending over the display panel 11a and the display panel 11b that are opened as illustrated in FIG. 1 is displayed, a gap between these display panels can be made less noticeable.

3. Modifications

3-1. First Modification

Figure 7:
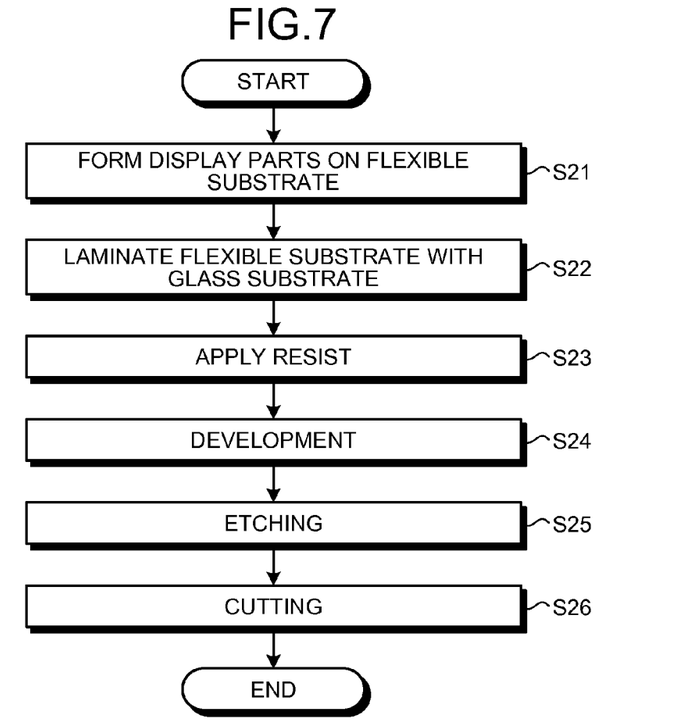
FIG. 7 is a flowchart illustrating a first modification of the method for manufacturing the display device.

FIG. 7 is a flowchart illustrating a first modification of the method for manufacturing the display device 10. In this modification, first of all, two display parts are formed on flexible substrates (Step S21). The two display parts correspond to a display part 17a and the display part 17b. A portion of the display parts may be formed on one flexible substrate, and the remaining portion of the display parts may be formed on the other flexible substrate. The display parts may be entirely formed on one flexible substrate. The process of forming the display parts may include a plurality of processes such as a process of forming transparent electrodes or a process of forming liquid crystal layers. At this stage, the sealing member 18 is mounted on the flexible substrates.

Subsequently, the two glass substrates are laminated with each other in such a manner that the flexible substrates on which the display parts are formed are sandwiched therebetween (Step S22). At this stage, as illustrated in FIG. 5, a portion corresponding to the display panel 11a, a portion corresponding to the display panel 11b, and a portion corresponding to the connection part 12 are integrally formed.

Subsequently, the etching process for forming the connection part 12 is performed. To be more specific, resist 91 is applied to each of the glass substrates (Step S23) and thereafter, the development process removes the resist 91 corresponding to the portion in which the connection part 12 is formed (Step S24). As illustrated in FIG. 6, this constitutes a state that the resist 91 is remained on the surface of each of the glass substrates except for the portion in which the connection unit 12 is formed. An etching process is performed in this state thus removing the glass substrates that cover the portions corresponding to the connection part 12 (Step S25).

Thereafter, a cutting process removes unnecessary portions (Step S26). In Step S21 to Step S25, a plurality of display devices may be simultaneously formed as an integral body. In this case, in Step S26, the integral body is separated into the respective display devices.

In FIG. 7, an example of forming the connection part 12 by etching is explained. However, a process for forming the connection part 12 in a state illustrated in FIG. 5 is not limited to the etching process. For example, a mechanical process such as machining or grinding may remove a portion of the glass substrate that covers a portion corresponding to the connection part 12.

As explained heretofore, the display device 10 may be manufactured in such a manner that the display parts are formed on the flexible substrates and thereafter, the flexible substrates and the glass substrates are laminated with each other. In this case also, a portion corresponding to the display panel 11a, a portion corresponding to the display panel 11b, and a portion corresponding to the connection part 12 are integrally formed and thereafter, a member with high strength covering a portion corresponding to the connection part 12 is removed. Accordingly, it is easy to adjust the width of the connection part 12 thus narrowing a distance between the display panel 11a and the display panel 11b. The distance between the display panel 11a and the display panel 11b is narrowed and hence, when one picture extending over the display panel 11a and the display panel 11b that are opened as illustrated in FIG. 1 is displayed, a gap between these display panels can be made less noticeable.

3-2. Second Modification

Figure 8:
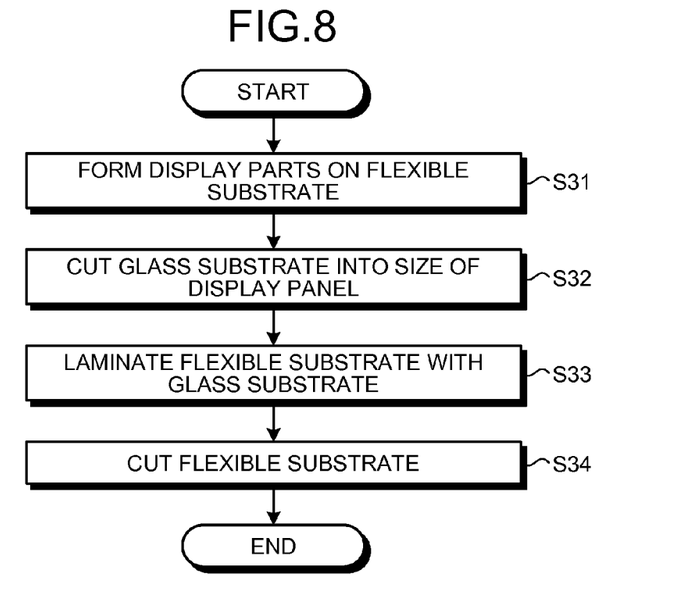
FIG. 8 is a flowchart illustrating a second modification of the method for manufacturing the display device.

FIG. 8 is a flowchart illustrating a second modification of the method for manufacturing the display device 10. In this modification, first of all, two display parts are formed on flexible substrates (S31). The two display parts correspond to the display part 17a and the display part 17b. A portion of the display parts may be formed on one flexible substrate, and the remaining portion of the display parts may be formed on the other flexible substrate. The display parts may be entirely formed on one flexible substrate. The process of forming the display parts may include a plurality of processes such as a process of forming transparent electrodes or a process of forming liquid crystal layers. At this stage, the sealing member 18 is mounted on the flexible substrates.

Subsequently, the glass substrates are cut into the size of the display panel (S32). The glass substrates may be cut prior to S31 in advance.

Subsequently, the glass substrates are laminated with the flexible substrates in such a manner that the glass substrates cover the display parts (S33). Thereafter, a cutting process removes unnecessary portions of the flexible substrates (S34).

As explained heretofore, the display device 10 may be manufactured by laminating the flexible substrates on which the display parts are formed with the glass substrates cut into the size of the display panel. In this case, portions other than the glass substrates are integrally formed in S31, and it is easy to adjust positions at which the glass substrates are laminated. Accordingly, it is easy to adjust the width of the connection part 12 thus narrowing a distance between the display panel 11a and the display panel 11b. The distance between the display panel 11a and the display panel 11b is narrowed and hence, when one picture extending over the display panel 11a and the display panel 11b that are opened as illustrated in FIG. 1 is displayed, a gap between these display panels can be made less noticeable.

3-3. Third Modification

Figure 9:
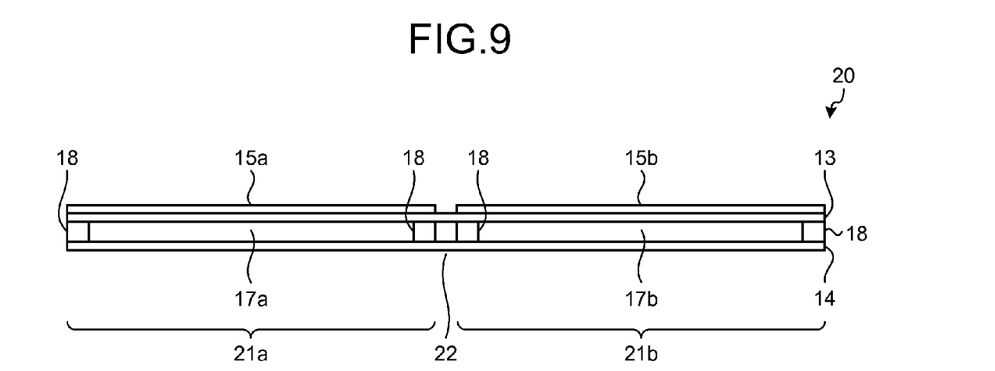
FIG. 9 is a sectional view of a display device according to a third modification.

FIG. 9 is a sectional view of a display device 20 according to a third modification of the display device 10. As illustrated in FIG. 9, the display device 20 includes a display panel 21a, (a first display panel), a display panel 21b (a second display panel), a connection part 22 that connects the display panel 21a and the display panel 21b.

The display panel 21a has a configuration similar to that of the display panel 11a except that the display panel 21a has no substrate 16a. The display panel 21b has a configuration similar to that of the display panel 11b except that the display panel 21b has no substrate 16b. The connection part 22 has the same configuration as that of the connection part 12.

The display device 20 is, for example, manufactured by further removing, in Step S14 to Step S16 illustrated in FIG. 4, the substrates 16a and 16b.

In this manner, even when there exists no member corresponding to the substrates 16a and 16b, the display panels 21a and 21b can ensure sufficient strength due to the protective layers 15a and 15b. Accordingly, the display device 20 can exhibit advantages similar to those of the display device 10. In addition, the display device 20 can reduce the thickness thereof compared with the display device 10.

3-4. Fourth modification

Figure 10:
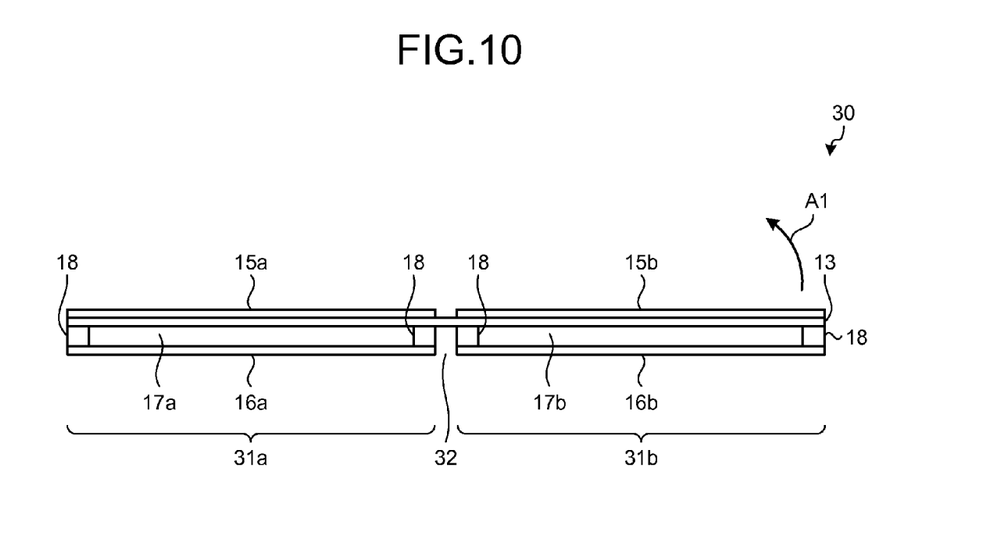
FIG. 10 is a sectional view of a display device according to a fourth modification.

FIG. 10 is a sectional view of a display device 30 according to a fourth modification of the display device 10. As illustrated in FIG. 10, the display device 30 includes a display panel 31a (a first display panel), a display panel 31b (a second display panel), and a connection part 32 that connects the display panel 31a and the display panel 31b.

The display panel 31a, the display panel 31b, and the connection part 32 respectively have configurations similar to those of the display panel 11a, the display panel 11b, and the connection part 12 except that each of the display panel 31a, the display panel 31b, and the connection part 32 includes no flexible substrate 14.

In this manner, even when there exists no member corresponding to one of the flexible substrates, the connection part 32 can connect the display panel 31a and the display panel 31b in a foldable manner. Accordingly, the display device 30 can exhibit advantages similar to those of the display device 10. In addition, the display device 30 can reduce the thickness thereof compared to the display device 10.

When the display panels are connected to each other with the use of one flexible substrate, it is preferable that the flexible substrate be provided to a side of the display device close to a surface inwardly located when folding the display device 30. For example, when the display device 30 is folded in the direction indicated by an arrow A1 in FIG. 10, the flexible substrate 13 is provided to a side of the display device 30 close to the protective layers 15a and 15b inwardly located when folding the display device 30. Due to such a configuration, a distance between the display panel 31a and the display panel 31b can be further narrowed.

3-5. Fifth Modification

Figure 11:
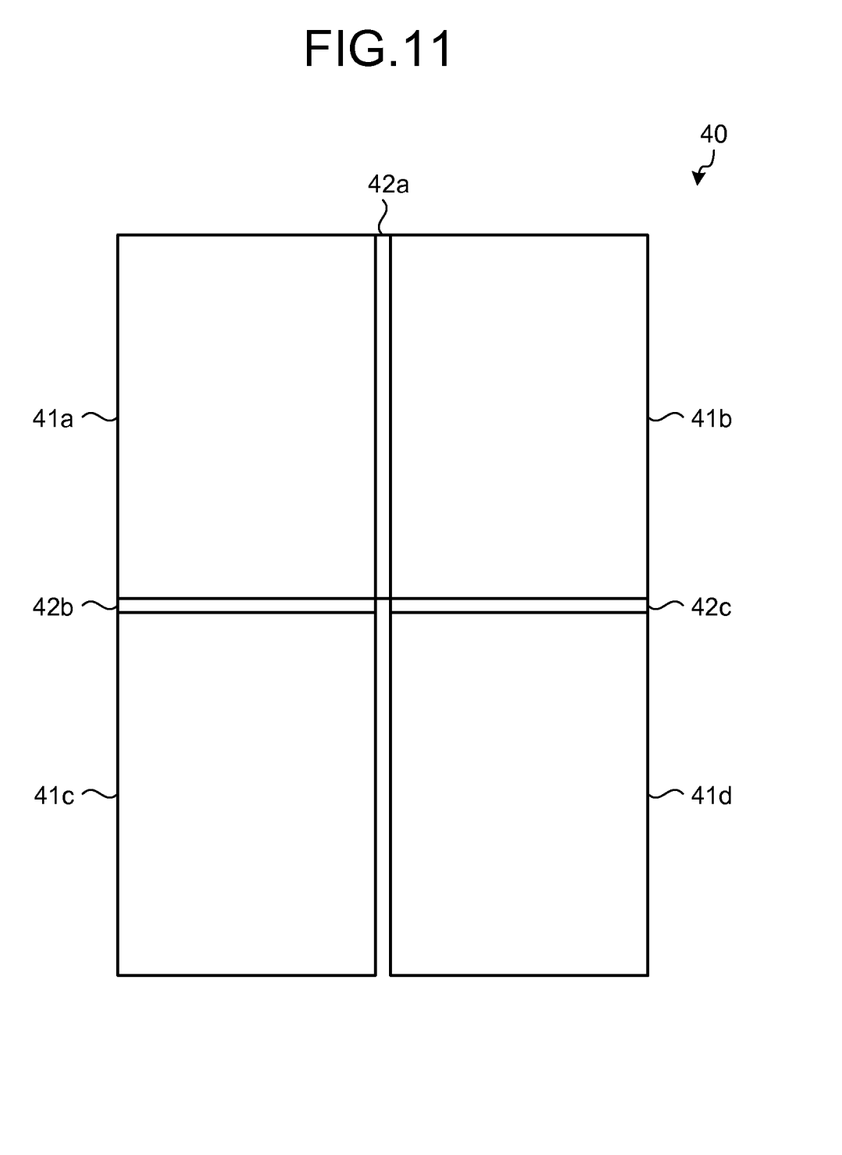
FIG. 11 is a view illustrating a state that a display device according to a fifth modification is opened.
Figure 12:
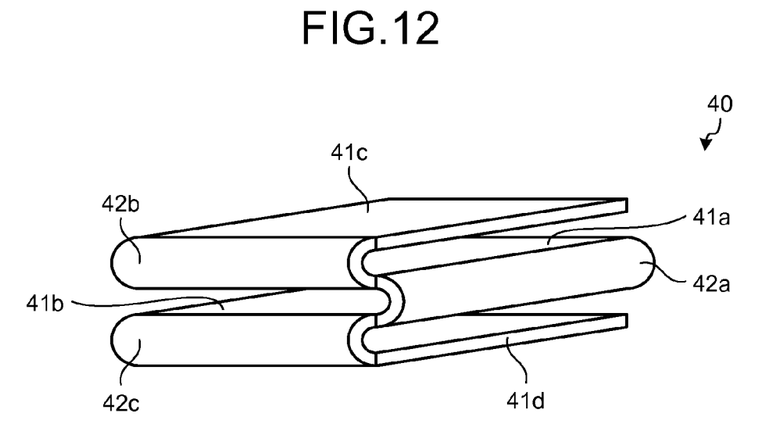
FIG. 12 is a view illustrating a state that the display device in the fifth modification is folded.

FIG. 11 is a view illustrating a state that a display device 40 according to a fifth modification of the display device 10 is opened. FIG. 12 is a view illustrating a state that the display device 40 is folded. As illustrated in FIG. 11 and FIG. 12, the display device 40 includes a display panel 41a, a display panel 41b, a display panel 41c, a display panel 41d, a connection part 42a, a connection part 42b, and a connection part 42c.

Each of the display panel 41a, the display panel 41b, the display panel 41c, and the display panel 41d has a configuration similar to that of the display panel 11a and the display panel 11b. Each of the connection part 42a, the connection part 42b, and the connection part 42c has a configuration similar to that of the connection part 12.

The connection part 42a connects the display panel 41a and the display panel 41b. The connection part 42b connects the display panel 41a and the display panel 41c. The connection part 42c connects the display panel 41b and the display panel 41d.

The display device 40 includes four display panels whose number is twice the number of display panels in the display device 10 and, at the same time, each of the connection part 42a, the connection part 42b, and the connection part 42c has flexibility and hence, as illustrated in FIG. 12, the display device 40 can be folded to a size similar to that of the display device 10. Accordingly, the display device 40 can maintain easy carriage and storage and, at the same time, display a picture larger than a picture displayable on the display device 10.

3-6. Sixth Modification

Figure 13:
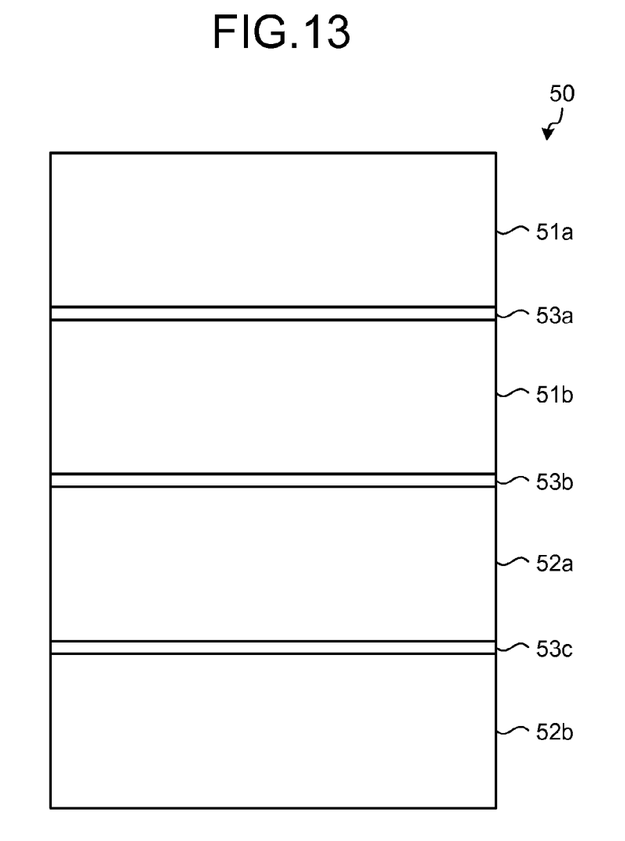
FIG. 13 is a view illustrating a state that a display device according to a sixth modification is opened.
Figure 14:
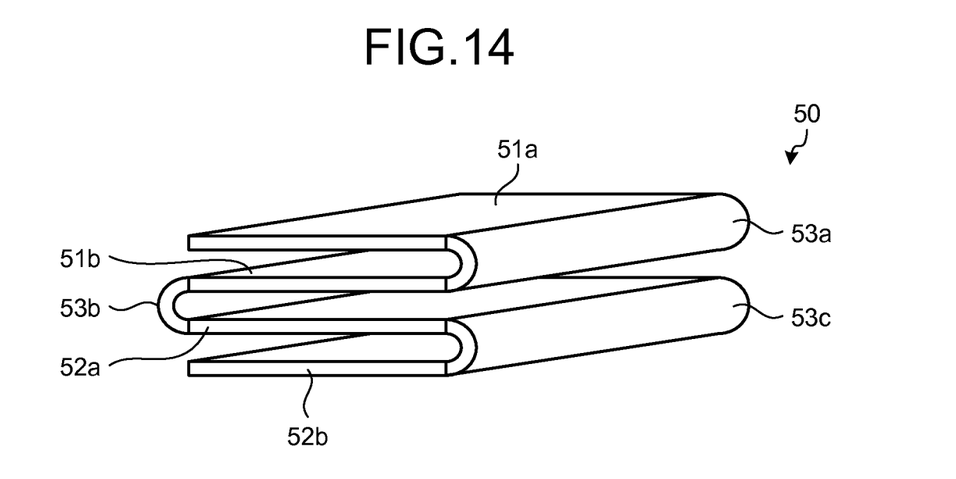
FIG. 14 is a view illustrating a state that the display device in the sixth modification is folded.

FIG. 13 is a view illustrating a state that a display device 50 according to a sixth modification of the display device 10 is opened. FIG. 14 is a view illustrating a state that the display device 50 is folded. As illustrated in FIG. 13 and FIG. 14, the display device 50 includes a display panel 51a, a display panel 51b, a touch panel 52a, a touch panel 52b, a connection part 53a, a connection part 53b, and the connection part 53c.

Each of the display panel 51a and the display panel 51b has a configuration similar to that of the display panel 11a and the display panel 11b. Each of the touch panel 52a and the touch panel 52b has a configuration similar to that of the display panel 11a and the display panel 11b except that each of the touch panel 52a and the touch panel 52b has a touch sensor for detecting a touch operation. Each of the connection part 53a, the connection part 53b, and the connection part 53c has a configuration similar to that of the connection part 12.

The connection part 53a connects the display panel 51a and the display panel 51b. The connection part 53b connects the display panel 51b and the touch panel 52a. The connection part 53c connects the touch panel 52a and the touch panel 52b.

The display device 50 includes a user interface (UI) functional component such as a touch panel other than a display panel and, at the same time, each of the connection part 53a, the connection part 53b, and the connection part 53c has flexibility and hence, as illustrated in FIG. 14, the display device 50 can be folded to a size similar to that of the display device 10. Accordingly, the display device 50 can maintain easy carriage and storage properties and, at the same time, provide more functions than those provided by the display device 10.

The number of the UI functional components such as a display panel and the connection parts that are included in the display device is not limited to the above-mentioned examples. The number of kinds of the UI functional components included in the display device is not limited to the above-mentioned examples. Examples of the UI functional components include, but are not limited to a vibration element and a touch sensor (tablet) capable of sensing a tool force. The manner of folding the display device is not limited to the above-mentioned examples.

4. Application Example

Electronic Apparatus

An example that applies the above-mentioned display device 10 to an electronic apparatus is explained.

Figure 15:
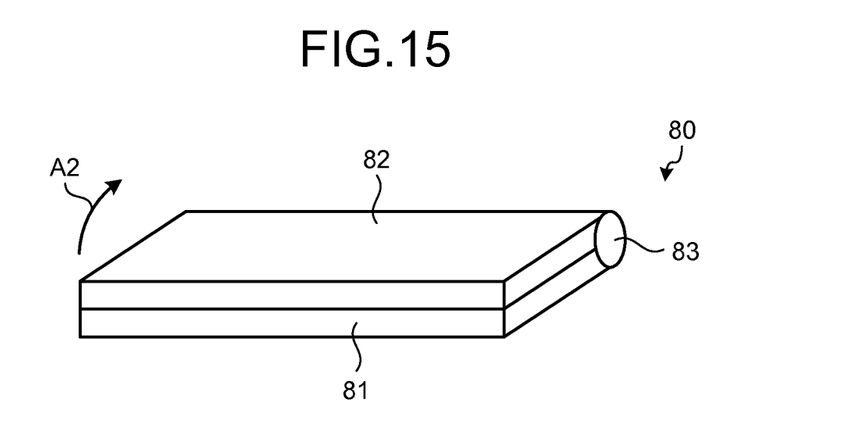
FIG. 15 is a view illustrating a state that an electronic apparatus provided with the display device in the embodiment is closed.
Figure 16:
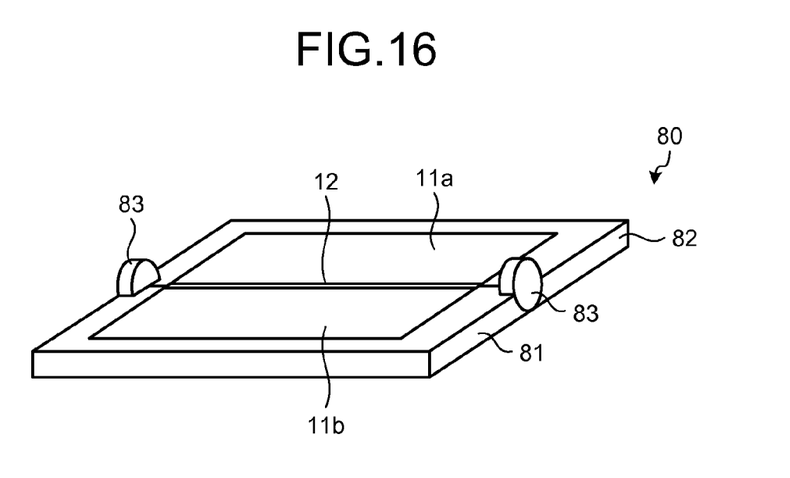
FIG. 16 is a view illustrating a state that the electronic apparatus provided with the display device in the embodiment is opened.
Figure 17:
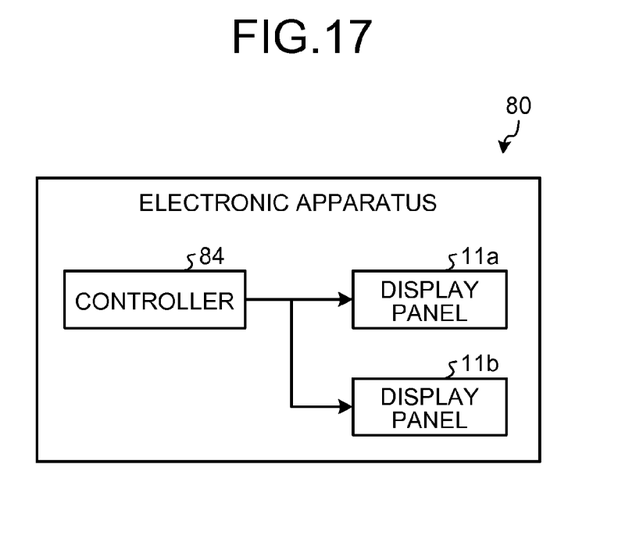
FIG. 17 is a schematic block diagram of the electronic apparatus provided with the display device in the embodiment.

FIG. 15 is a view illustrating a state that an electronic apparatus provided with the display device 10 is closed. FIG. 16 is a view illustrating a state that the electronic apparatus provided with the display device 10 is opened. FIG. 17 is a schematic block diagram of the electronic apparatus provided with the display device 10.

As illustrated in FIG. 15 and FIG. 16, an electronic apparatus 80 includes a casing 81, a casing 82, and a hinge unit 83 that connects the casing 81 and the casing 82. The electronic apparatus 80 is constituted such that the casing 81 and the casing 82 are rotatable relative to each other with the hinge unit 83 as an axis of rotation. Due to such a configuration, the electronic apparatus 80 is transformed from the state illustrated in FIG. 15 into the state illustrated in FIG. 16 by relatively rotating the casing 82 in the direction indicated by an arrow A2.

The display device 10 is constituted such that the display panels 11a and 11b are concealed by the casings 81 and 82 in a closed state illustrated in FIG. 15, and the display panels 11a and 11b are exposed to the outside in an opened state illustrated in FIG. 16. In the closed state illustrated in FIG. 15, the display device 10 is transformed into a state that the display device 10 is folded as illustrated in FIG. 2. In the state illustrated in FIG. 16, the display device 10 is transformed into a state that the display device is opened as illustrated in FIG. 1. The electronic apparatus 80 is constituted in a compact manner in the closed state thereof, and constituted such that the two display panels 11a and 11b that are adjacent to each other are exposed in the opened state thereof. Accordingly, the electronic apparatus 80 can achieve both of the display of a large picture and easy carriage and storage properties.

As illustrated in FIG. 17, the electronic apparatus 80 includes a controller 84. The controller 84 controls the display of the display panels 11a and 11b. The display panels 11a and 11b are electrically independent from each other and hence, the controller 84 can control the display panels 11a and 11b to display different pictures, and also control the display panels 11a and 11b to display one picture extending over the display panels 11a and 11b.

5. Aspects of Present Disclosure

The present disclosure includes the following aspects.
(1) A display device comprising:
  a first display panel including a first protective layer;
  a second display panel including a second protective layer; and
  a connection part that connects the first display panel and the second display panel,
  wherein
    the connection part includes a portion of a flexible substrate included in the first display panel and the second display panel, and
    the first protective layer and the second protective layer have higher strength than the flexible substrate.
(2) The display device according to (1), wherein the connection part includes no electrical circuit.
(3) The display device according to (1), wherein
  the first display panel includes a first display part sealed with a member including the flexible substrate, and
  the second display panel includes a second display part sealed with a member including the flexible substrate.
(4) An electronic apparatus comprising:
  a first display panel including a first protective layer;
  a second display panel including a second protective layer; and
  a connection part that connects the first display panel and the second display panel,
  wherein
    the connection part includes a portion of a flexible substrate included in the first display panel and the second display panel, and
    the first protective layer and the second protective layer have higher strength than the flexible substrate.
(5) A method for manufacturing a display device including a first display part and a second display part, the method comprising:
  forming the first display part and the second display part protected by respective protective layers that are arranged above a flexible substrate with a space having a predetermined width interposed therebetween and have higher strength than the flexible substrate; and removing a portion of the protective layers corresponding to the space.

(6) The method for manufacturing the display device according to (5), wherein the forming of the first display part and the second display part includes:

forming the flexible substrate above the protective layers; and forming the first display part and the second display part above the flexible substrate formed above the protective layers.

(7) The method for manufacturing the display device according to (5), wherein the forming of the first display part and the second display part includes:

forming the first display part and the second display part above the flexible substrate; and laminating the protective layers with the flexible substrate above which the first display part and the second display part are formed.

The present disclosure can provide a display device and an electronic apparatus that can be folded and, at the same time, have high durability, and a method for manufacturing the display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a first display panel;
a first protective layer included in the first display panel;
a second display panel;
a second protective layer included in the second display panel;
a connection part that connects the first display panel and the second display panel; and
a first flexible substrate included in the first display panel and the second display panel, a portion of the first flexible substrate being included in the connection part, and the first protective layer and the second protective layer being layered on the first flexible substrate; and
a second flexible substrate included in the first display panel and the second display panel, a portion of the second flexible substrate being included in the connection part,
wherein the first display panel includes:
a first portion of the first flexible substrate;
a first portion of the second flexible substrate opposed to the first portion of the first flexible substrate;
a first display part arranged between the first portion of the first flexible substrate and the first portion of the second flexible substrate; and
a first sealing member that surrounds the outer periphery of the first display part so as to seal the first display part between the first portion of the first flexible substrate and the first portion of the second flexible substrate,
wherein the second display panel includes:
a second portion of the first flexible substrate;
a second portion of the second flexible substrate opposed to the second portion of the first flexible substrate;
a second display part arranged between the second portion of the first flexible substrate and the second portion of the second flexible substrate; and
a second sealing member that surrounds the outer periphery of the second display part so as to seal the second display part between the second portion of the first flexible substrate and the second portion of the second flexible substrate,
wherein the first flexible substrate includes a third portion arranged between the first display part and the second display part,
wherein the second flexible substrate includes a third portion arranged between the first display part and the second display part,
wherein the connection part includes the third portion of the first flexible substrate and the third portion of the second flexible substrate,
wherein a strength of the first protective layer is higher than a strength of the first flexible substrate, and
wherein a strength of the second protective layer is higher than the strength of the first flexible substrate.

2. The display device according to claim 1, the connection part includes no electrical circuit.

3. The display device according to claim 1, wherein
the first protective layer is inflexible and the first protective layer keeps the first display part flat, and
the second protective layer is inflexible and the second protective layer keeps the second display part flat.

4. An electronic apparatus comprising:
a first display panel;
a first protective layer included in the first display panel;
a second display panel;
a second protective layer included in the second display panel;
a first flexible substrate included in the first display panel and the second display panel, a portion of the first flexible substrate being included in the connection part, and the first protective layer and the second protective layer being layered on the first flexible substrate; and
a second flexible substrate included in the first display panel and the second display panel, a portion of the second flexible substrate being included in the connection part,
wherein the first display panel includes:
a first portion of the first flexible substrate;
a first portion of the second flexible substrate opposed to the first portion of the first flexible substrate;
a first display part arranged between the first portion of the first flexible substrate and the first portion of the second flexible substrate; and
a first sealing member that surrounds the outer periphery of the first display part so as to seal the first display part between the first portion of the first flexible substrate and the first portion of the second flexible substrate,
wherein the second display panel includes:
a second portion of the first flexible substrate;
a second portion of the second flexible substrate opposed to the second portion of the first flexible substrate;
a second display part arranged between the second portion of the first flexible substrate and the second portion of the second flexible substrate; and a second sealing member that surrounds the outer periphery of the second display part so as to seal the second display part between the second portion of the first flexible substrate and the second portion of the second flexible substrate, wherein the first flexible substrate includes a third portion arranged between the first display part and the second display part, wherein the second flexible substrate includes a third portion arranged between the first display part and the second display part, wherein the connection part includes the third portion of the first flexible substrate and the third portion of the second flexible substrate, wherein a strength of the first protective layer is higher than a strength of the first flexible substrate, and wherein a strength of the second protective layer is higher than the strength of the first flexible substrate.

5. A method for manufacturing a display device including a first display panel, and a second display panel, and a connection part that connects the first display panel and the second display panel, the method comprising:

forming a first display part and a second display part protected by a protective layer, the protective layer being arranged on a first flexible substrate; and forming a first protective layer in the first display panel and the second protective layer in the second display panel by removing a portion of the protective layer corresponding to the space having a predetermined width, wherein the first display panel includes:
a first portion of the first flexible substrate;
a first portion of a second flexible substrate opposed to the first portion of the first flexible substrate;
the first display part arranged between the first portion of the first flexible substrate and the first portion of the second flexible substrate; and
a first sealing member that surrounds the outer periphery of the first display part so as to seal the first display part between the first portion of the first flexible substrate and the first portion of the second flexible substrate, wherein the second display panel includes:
a second portion of the first flexible substrate;
a second portion of the second flexible substrate opposed to the second portion of the first flexible substrate;
the second display part arranged between the second portion of the first flexible substrate and the second portion of the second flexible substrate; and
a second sealing member that surrounds the outer periphery of the second display part so as to seal the second display part between the second portion of the first flexible substrate and the second portion of the second flexible substrate, wherein the first flexible substrate includes a third portion arranged between the first display part and the second display part, wherein the second flexible substrate includes a third portion arranged between the first display part and the second display part, wherein the connection part includes the third portion of the first flexible substrate and the third portion of the second flexible substrate, and wherein a strength of each of the first protective layer and the second protective layer is higher than a strength than of the first flexible substrate.

6. The method for manufacturing the display device according to claim 5, the forming of the first display part and the second display part includes
forming the first flexible substrate on the protective layer, and
forming the first display part and the second display part above the first flexible substrate formed on the protective layer.

7. The method for manufacturing the display device according to claim 5, the forming of the first display part and the second display part includes:
forming the first display part and the second display part on the first flexible substrate; and
laminating the protective layer with the first flexible substrate above which the first display part and the second display part are formed.

* * * * *